(12) United States Patent  (10) Patent No.: US 8,123,352 B2
Matsumoto et al.  (45) Date of Patent: Feb. 28, 2012

(54) HEAD MOUNTED DISPLAY

(75) Inventors: Shigeru Matsumoto, Toyokawa (JP); Takeshi Ikeda, Fukui (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 12/659,820

(22) Filed: Mar. 23, 2010

(65) Prior Publication Data

US 2010/0246022 A1 Sep. 30, 2010

(30) Foreign Application Priority Data

Mar. 30, 2009 (JP) ................................. 2009-083173

(51) Int. Cl.
*G02C 1/00* (2006.01)
(52) U.S. Cl. ......................... 351/158; 351/114; 351/119
(58) Field of Classification Search .................... 351/41, 351/111, 113, 114, 118, 119, 121, 158
See application file for complete search history.

(56) References Cited

U.S. PATENT DOCUMENTS

| 4,869,575 A | 9/1989 | Kubik |
| 5,631,718 A | 5/1997 | Markovitz et al. |
| 5,781,272 A * | 7/1998 | Bright et al. ................... 351/123 |
| 2002/0021407 A1* | 2/2002 | Elliott ............................ 351/158 |
| 2008/0158506 A1 | 7/2008 | Fuziak |
| 2010/0073262 A1 | 3/2010 | Matsumoto |

FOREIGN PATENT DOCUMENTS

| DE | 41 21 691 A1 | 1/1992 |
| FR | 567 255 A | 2/1924 |
| JP | A-2008-176096 | 7/2008 |
| JP | A-2010081272 | 4/2010 |
| WO | WO 2004/003634 A1 | 1/2004 |

OTHER PUBLICATIONS

European Search Report dated Sep. 30, 2011 issued in European Patent Application No. 10250625.0.

* cited by examiner

*Primary Examiner* — Huy K Mai

(74) *Attorney, Agent, or Firm* — Oliff & Berridge, PLC

(57) ABSTRACT

A head mounted display includes: a projection part which projects an image corresponding to image information onto a retina of an eye of a user; and an eyeglasses-type frame which supports the projection part. The eyeglasses-type frame includes a resilient bent portion having a Z shape in a plan view on middle portions of left and right temples thereof. The projection part is arranged in front of the resilient bent portion of the eyeglasses-type frame.

14 Claims, 9 Drawing Sheets

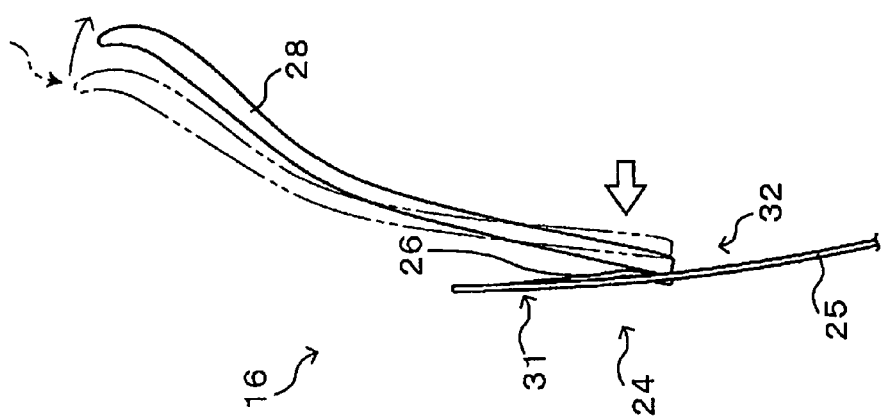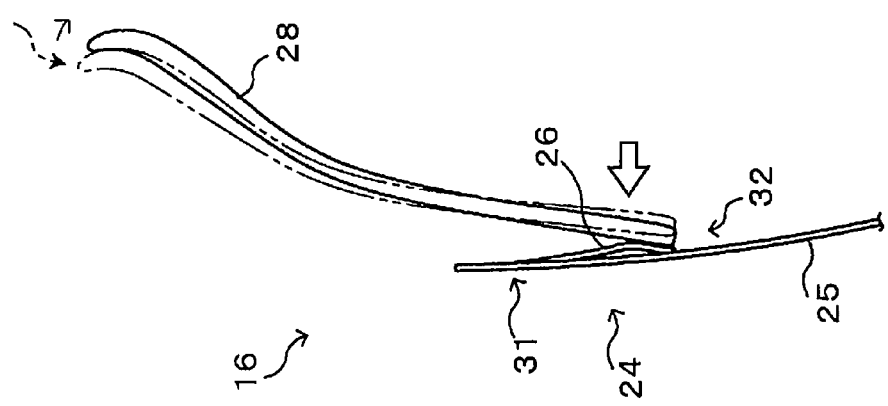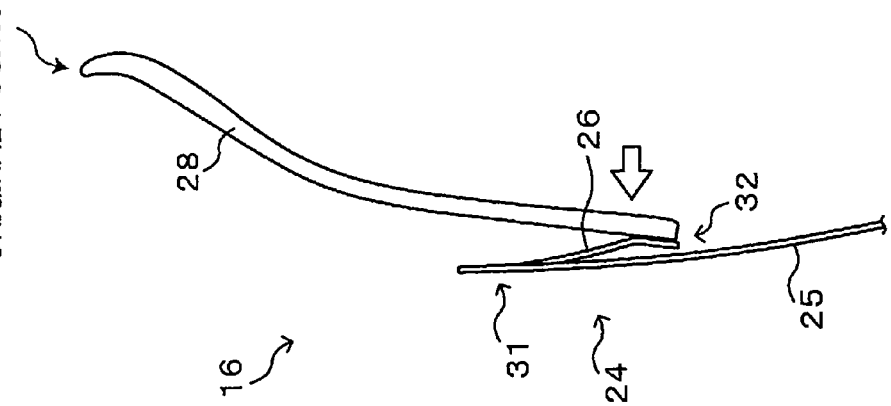

HEAD MOUNTED DISPLAY

CROSS-REFERENCE TO RELATED APPLICATIONS

This application is based on and claims the benefit of priority from Japanese Patent Application No. 2009-083173 filed on Mar. 30, 2009, the entire contents of which are incorporated herein by reference.

BACKGROUND

1. Field

The present invention relates to a head mounted display which is used by being mounted on the head.

2. Description of the Related Art

Recently, a type of image display device which a user mounts on his head (so-called head mounted display (HMD)) has been popularly used. The head mounted display has been already commercialized as a virtual reality display or a personal theater, for example. Because of the portability of the head mounted display, the application of the head mounted display to a technical field such as a wearable computer, for example, is also expected.

Such a head mounted display includes, in general, a projection unit which is arranged in front of an eye of a user and projects an image to be recognized by the user, and a support member which positions the projection unit in front of the eye of the user. The support member is mounted on a user's head. In this head mounted display, an image light which is radiated from a projection unit is incident on a pupil of a user, and directly forms an image on a retina thus allowing the user to recognize the image.

Up to now, various shapes have been proposed as a shape of the support member of the head mounted display. Among these support members, a head mounted display which is provided with an approximately eyeglasses-type support member (hereinafter also referred to as "eyeglasses-type frame") has an advantage that a user can easily mount the head mounted display on his head and, at the same time, the projection unit can relatively accurately be arranged in front of an eye of the user.

SUMMARY OF THE INVENTION

However, the above-mentioned conventional eyeglasses-type frame is designed such that, because of the necessity of arranging the projection unit at a suitable position for the projection of an image, in many cases, a deflection quantity of a front portion of the eyeglasses-type frame which is arranged in front of an eye of a user is set small. Accordingly, in the conventional eyeglasses-type frame, when an indefinite number of people use the same head mounted display, some people cannot obtain desired feeling of comfort due to the difference in their head shapes.

The present invention has been made in view of such circumstances, and it is an object of the present invention to provide a head mounted display which can be snugly mounted on a user's head in conformity with a shape of a user's head.

To achieve the above-mentioned object, according to one aspect of the present invention, there is provided a head mounted display including: a projection part which projects an image corresponding to image information onto a retina of an eye of a user; and an eyeglasses-type frame on which the projection part is mounted, wherein the eyeglasses-type frame includes a resilient bent portion having a Z shape in a plan view on middle portions of left and right temples of thereof, and the projection part is arranged in front of the resilient bent portion of the eyeglasses-type frame.

BRIEF DESCRIPTION OF DRAWINGS

FIG. 6A to FIG. 6C are explanatory views showing the deflection of a resilient bent portion;

DESCRIPTION

Hereinafter, a head mounted display 1 (hereinafter, also referred to as an HMD 1) according to this embodiment is explained in conjunction with drawings.

[Constitution of HMD]

Figure 1:
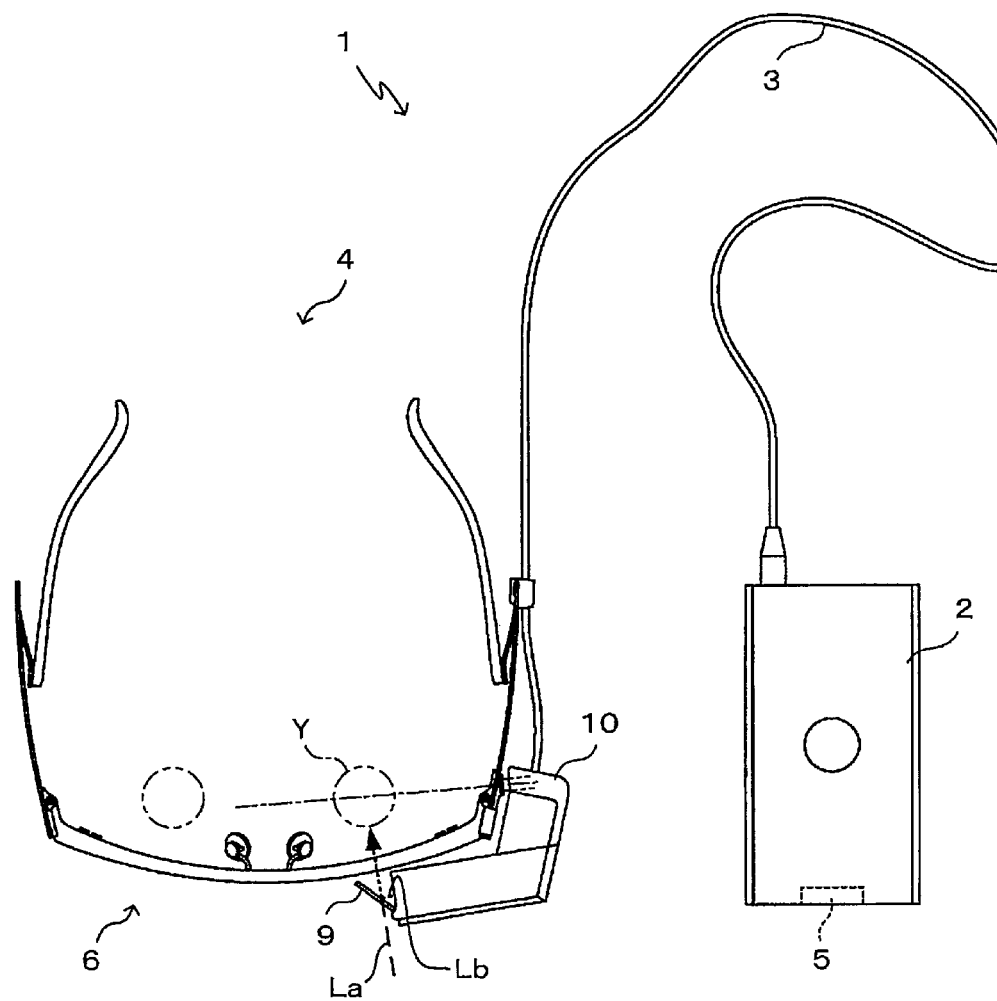
FIG. 1 is an explanatory view showing the appearance of an HMD according to this embodiment.

Firstly, the overall constitution of the HMD 1 is explained in conjunction with FIG. 1.

As shown in FIG. 1, the HMD 1 according to this embodiment includes a control unit 2, a transmission cable 3, and a head mounting device 4. The control unit 2 radiates a laser beam having intensity corresponding to an image signal as an image light. The transmission cable 3 includes an optical fiber cable 50 (described later) which transmits the image light radiated from the control unit 2. The transmission cable 3 also includes a drive signal transmission cable for transmitting a horizontal drive signal 61 and a vertical drive signal 62 for synchronizing a horizontal scanning part 80, a vertical scanning part 90 provided to a projection part 10 described later and a light source unit 11 described later. When a user mounts the head mounting device 4 on his head, the head mounting device 4 scans the transmitted image light, projects the scanned image light onto an eye of the user, and displays an image to the user.

The control unit 2 forms an image signal based on content information stored in a content memory part incorporated in the control unit 2, and radiates a laser beam having intensity corresponding to the image signal to the transmission cable 3 as an image light. Further, the control unit 2 has an external input/output terminal 5, and receives inputting of an image signal from the outside, and can perform transmission/reception of content information or the like for forming an image signal between the control unit 2 and a personal computer or the like not shown in the drawing. Here, content information is constituted of at least one data out of data for displaying characters, data for displaying an image, and data for displaying an animated picture. For example, content information is a document file, an image file, an animated picture file or the like which is used in a personal computer or the like.

The head mounting device 4 is constituted of the projection part 10 which scans an image light transmitted through the transmission cable 3 and allows a user to recognize the image light as a display image, and an eyeglasses-type frame 6 which supports the projection part 10. The HMD 1 according to this embodiment is characterized by this eyeglasses-type frame 6, and the specific constitution of the eyeglasses-type frame 6 is explained in detail later.

The projection part 10 allows image lights whose intensities are modulated for respective colors (R, G, B) to be incident on an eye Y of a user, and scans the image light in two-dimensional directions on a retina of the eye Y of the user thus forming a retinal scanning display which allows the user to visually recognize an image corresponding to the image information.

The projection part 10 is provided with a half mirror 9 at a position where the half mirror 9 faces the eye Y of the user. Accordingly, external light La passes through the half mirror 9 and is incident on the eye Y of the user and, at the same time, the image light Lb radiated from the projection part 10 is reflected on the half mirror 9 and is incident on the eye Y of the user. Accordingly, the user can visually recognize an image which is formed by overlapping the image generated by the image light to scenery generated by the external light La.

In this manner, the HMD 1 is a see-through-type HMD which projects the image light onto the eye Y of the user while allowing the external light to pass therethrough. Although this embodiment is explained by taking the see-through-type HMD as an example, the HMD 1 does not always need to be a see-through-type HMD. Further, the HMD 1 is not always necessary to be an optical-scanning-type HMD.

[Electrical Constitution and Optical Constitution of HMD]

Figure 2:
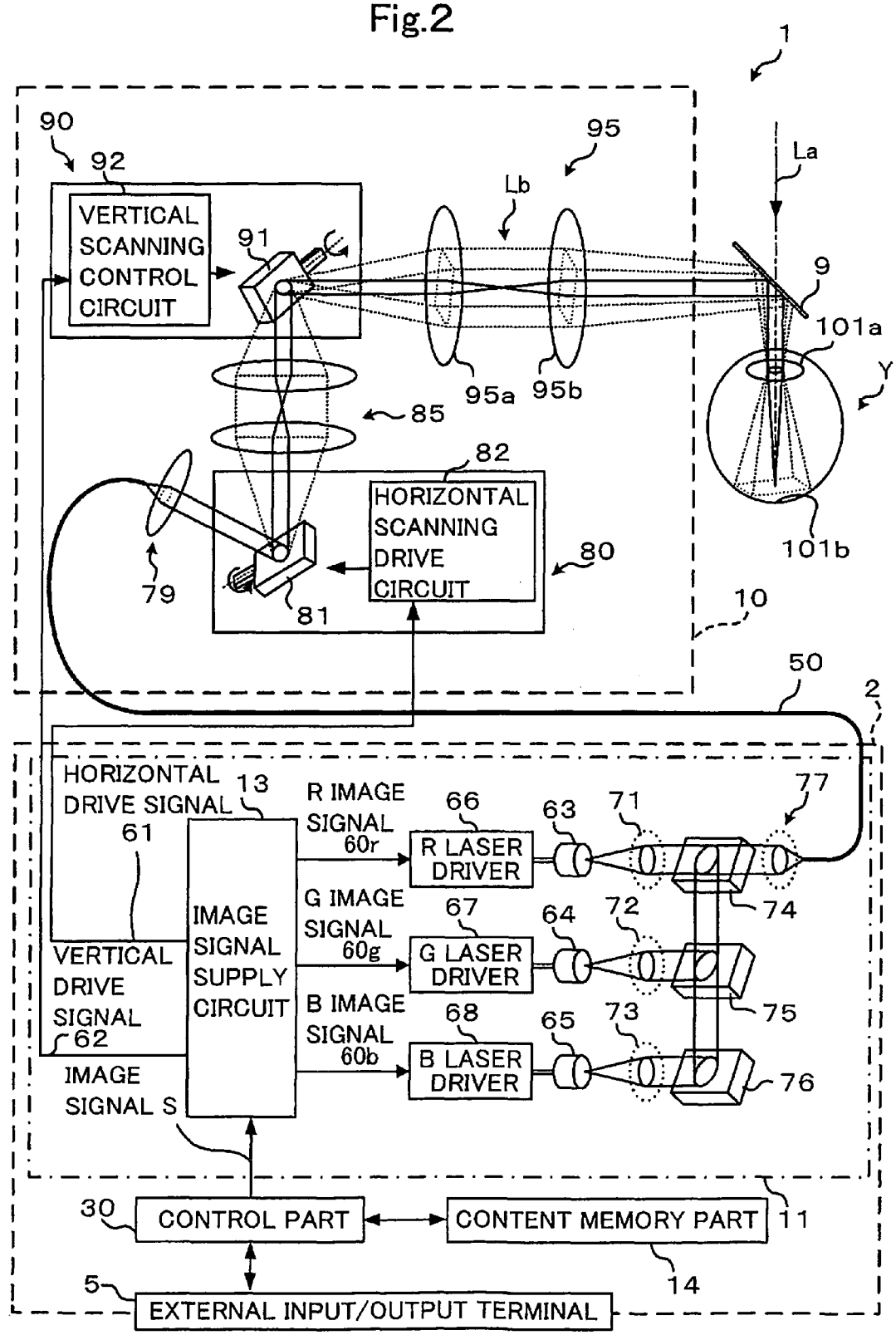
FIG. 2 is an explanatory view showing the electrical constitution and optical constitution of the HMD according to this embodiment.

Next, the electrical constitution and the optical constitution of the HMD 1 are explained in conjunction with FIG. 2.

As shown in FIG. 2, the HMD 1 includes the control unit 2, the half mirror 9 and the projection part 10. The control unit 2 includes a control part 30 which performs a systematic control of the operation of the whole HMD 1 and a light source unit 11. The control part 30 performs the systematic control of the operation of the whole HMD 1. The light source unit 11 reads image information from an image signal S supplied from the control part 30 for every pixel. Based on the read image information for every pixel, the light source unit 11 generates laser beams whose intensities are modulated for respective colors of R (red), G (green) and B (blue), and radiates the laser beams. Here, the light source unit 11 may not be included in the control unit 2, and may be included in the projection part 10.

(Light Source Unit 11)

The light source unit 11 includes an image signal supply circuit 13 which generates signals or the like which constitute elements for composing an image. When image data supplied from an externally connected device not shown in the drawing through an external input/output terminal 5 and image data based on content information which is preliminarily stored in a content memory part 14 having a memory area of a relatively large capacity are inputted to the control part 30, the control part 30 generates the image signal S based on these image data, and transmits the generated image signal S to the image signal supply circuit 13. Based on the transmitted image signal S, the image signal supply circuit 13 generates signals which respectively constitute elements for forming a display image for every pixel. That is, the image signal supply circuit 13 generates and outputs an R (red) image signal 60r, a G (green) image signal 60g, and a B (blue) image signal 60b.

Further, the image signal supply circuit 13 outputs a horizontal drive signal 61 which is used in a horizontal scanning part 80, and a vertical drive signal 62 which is used in a vertical scanning part 90. Here, the content memory part 14 may be formed of a magnetic memory medium such as a hard disk, an optical memory medium such as a CD-R, a flash memory or the like, for example.

Further, the light source unit 11 includes an R laser 63, a G laser 64, a B laser 65, an R laser driver 66 for driving the R laser 63, a G laser driver 67 for driving the G laser 64, and a B laser driver 68 for driving the B laser 65. The laser drivers 66, 67, 68 respectively radiate laser beams whose intensities are respectively modulated (hereinafter, also referred to as an "optical flux") based on the R image signal 60r, the G image signal 60g, and the B image signal 60b outputted from the image signal supply circuit 13 for every pixel. Each laser 63, 64, 65 may be constituted of a semiconductor laser or a solid-state laser having a mechanism for generating harmonics, for example. Here, when the semiconductor laser is used as the laser 63, 64; 65, the intensity of the laser beam may be modulated by directly modulating a drive current. On the other hand, when the solid laser is used as the laser 63, 64, 65, it is necessary to modulate the intensity of the laser beam by providing an external modulator to each laser 63, 64, 65.

Further, the light source unit 11 includes collimation optical systems 71, 72, 73, dichroic mirrors 74, 75, 76, and a coupling optical system 77. The collimation optical systems 71, 72, 73 are provided for collimating the laser beams radiated from the respective lasers 63, 64, 65. The dichroic mirrors 74, 75, 76 synthesize the laser beams which are collimated by the collimation optical systems 71, 72, 73. The coupling optical system 77 guides the laser beams which are synthesized by the dichroic mirrors 74, 75, 76 to the optical fiber cable 50.

In this manner, the laser beams radiated from the respective lasers 63, 64, 65 are collimated by the collimation optical systems 71, 72, 73 respectively and, thereafter, are incident on the dichroic mirrors 74, 75, 76 respectively. Then, the respective laser beams are reflected on or are allowed to pass through these dichroic mirrors 74, 75, 76 selectively corresponding to wavelengths thereof. The laser beams of three primary colors which are respectively incident on these three dichroic mirrors 74, 75, 76 are reflected on or are allowed to pass through the dichroic mirrors 74, 75, 76 selectively corresponding to wavelengths thereof, arrive at the coupling optical system 77, and are converged by the coupling optical system 77. Then, the converged laser beams are outputted to the optical fiber cable 50. Here, the optical fiber cable 50 is incorporated into the transmission cable 3 shown in FIG. 1.

(Projection Part 10)

The projection part 10 which is positioned between the light source unit 11 and an eye Y of a user includes a collimation optical system 79, the horizontal scanning part 80, the vertical scanning part 90, a first relay optical system 85, and a second relay optical system 95. The collimation optical system 79 collimates the laser beams which are generated by the light source unit 11 and are radiated through the optical fiber cable 50. The horizontal scanning part 80 scans the laser beams collimated by the collimation optical system 79 in the horizontal direction in a reciprocating manner for displaying an image. The vertical scanning part 90 scans the laser beams which are scanned in the horizontal direction by the horizontal scanning part 80 in the vertical direction. The first relay optical system 85 is arranged between the horizontal scanning part 80 and the vertical scanning part 90, and guides the laser beams which are scanned by the horizontal scanning part 80 to the vertical scanning part 90. The second relay optical system 95 radiates the laser beams scanned in the horizontal direction as well as in the vertical direction in this manner to a pupil 101a of the user.

The horizontal scanning part 80 and the vertical scanning part 90 are optical systems which, to bring the laser beams incident from the optical fiber cable 50 into a state which allows the laser beams to be projected onto the retina 101b of the user as an image, scan the laser beams in the horizontal direction as well as in the vertical direction to form the laser beams into scanned optical fluxes. In the explanation made hereinafter, the horizontal scanning part 80 and the vertical scanning part 90 are also referred to as scanning parts collectively.

The horizontal scanning part 80 includes a resonance-type deflecting element 81 having a deflecting surface for scanning the laser beams in the horizontal direction, and a horizontal scanning drive circuit 82 which, based on a horizontal drive signal 61, generates a drive signal for resonating the deflecting element 81 so as to swing the deflecting surface of the deflecting element 81.

On the other hand, the vertical scanning part 90 includes a non-resonance-type deflecting element 91 having a deflecting surface for scanning the laser beams in the vertical direction, and a vertical scanning control circuit 92 which generates, based on a vertical drive signal 62, a drive signal for forcibly swinging the deflecting surface of the deflecting element 91 in a non-resonant state. The vertical scanning part 90 scans the laser beams for forming the image in the vertical direction toward a final horizontal scanning line from a first horizontal scanning line for every 1 frame of an image to be displayed. Here, "horizontal scanning line" implies one scanning in the horizontal direction which is performed by the horizontal scanning part 80.

Further, the first relay optical system 85 is arranged between the horizontal scanning part 80 and the vertical scanning part 90, and relays the laser beams. The first relay optical system 85 converges the laser beams which are scanned in the horizontal direction by the deflecting surface of the deflecting element 81 on the deflecting surface of the deflecting element 91. Further, the converged laser beams are scanned in the vertical direction by the deflecting surface of the deflecting element 91 thus constituting an image light Lb. The image light Lb passes through the second relay optical system 95 in which two lenses 95a, 95b having a positive refractive power are arranged in series, is reflected on the half mirror 9 positioned in front of the eye Y, and is incident on the pupil 101a of the user. Due to the incident of the image light Lb (laser beams) on the pupil 101a, the display image corresponding to the image signal S is projected onto the retina 101b. Accordingly, the user is allowed to visually recognize the image light Lb as the display image.

In the second relay optical system 95, using the lens 95a, the respective laser beams have center lines thereof arranged substantially parallel to each other, and are respectively converted into converged laser beams. Then, using the lens 95b, the converged laser beams are arranged substantially parallel to each other and, at the same time, are converted such that the center lines of these laser beams are converged on the pupil 101a of the user. The lens 95b functions as an eyepiece optical system which allows the image light Lb (laser beams) scanned by the scanning part to be incident on the eye Y of the user thus projecting an image corresponding to the image signal S onto the retina 101b of the user.

Next, the specific constitution of the eyeglasses-type frame 6 which constitutes the head mounting device 4 is explained in conjunction with FIG. 3 to FIG. 9.

[Constitutional Features of Head Mounting Device 4]

Figure 3:
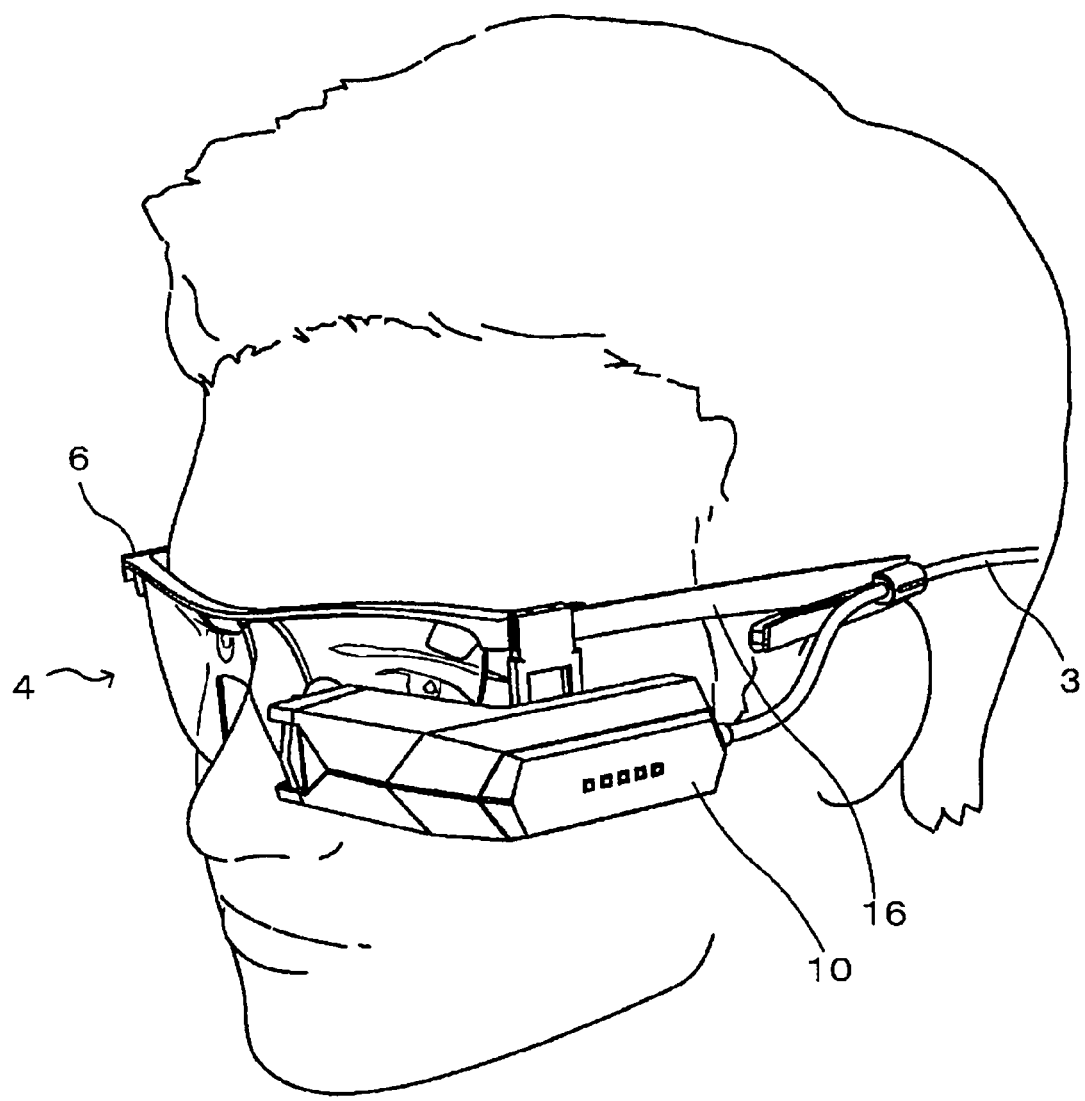
FIG. 3 is an explanatory view showing a user with a head mounting device on his head.

Firstly, the constitutional features of the head mounting device 4 are explained in conjunction with FIG. 3.

As shown in FIG. 3, the head mounting device 4 is mounted on a head of a user in the same manner as general-use eyeglasses for correcting visual acuity. The head mounting device 4 is configured to allow the projection part 10 to be easily arranged before an eye of the user.

The head mounting device 4 is also characterized in that a middle portion of the eyeglasses-type frame 6 is formed in a Z-shape so as to increase a deflection quantity of a temple 16 of the eyeglasses-type frame 6 so that a shape of the eyeglasses-type frame 6 is changed corresponding to the difference in a shape of a head of a user whereby the eyeglasses-type frame 6 can be mounted on the user's head as snugly as possible. That is, the eyeglasses-type frame 6 has the Z-shape suspension structure which generates the deflection.

Further, the transmission cable 3 which extends from the projection part 10 is configured to be mountable on the temple 16 of the eyeglasses-type frame 6. Accordingly, when the user mounts the head mounting device 4 on his head, the transmission cable 3 is mounted on the temple 16 of the eyeglasses-type frame 6 and hence, the user is freed from awkwardness brought about by sagging of the transmission cable 3.

Further, the Z-shape of the temple 16 provides an excellent design which gives a stylish impression to a viewer.

[Overall Constitution of Head Mounting Device 4]

Figure 4:
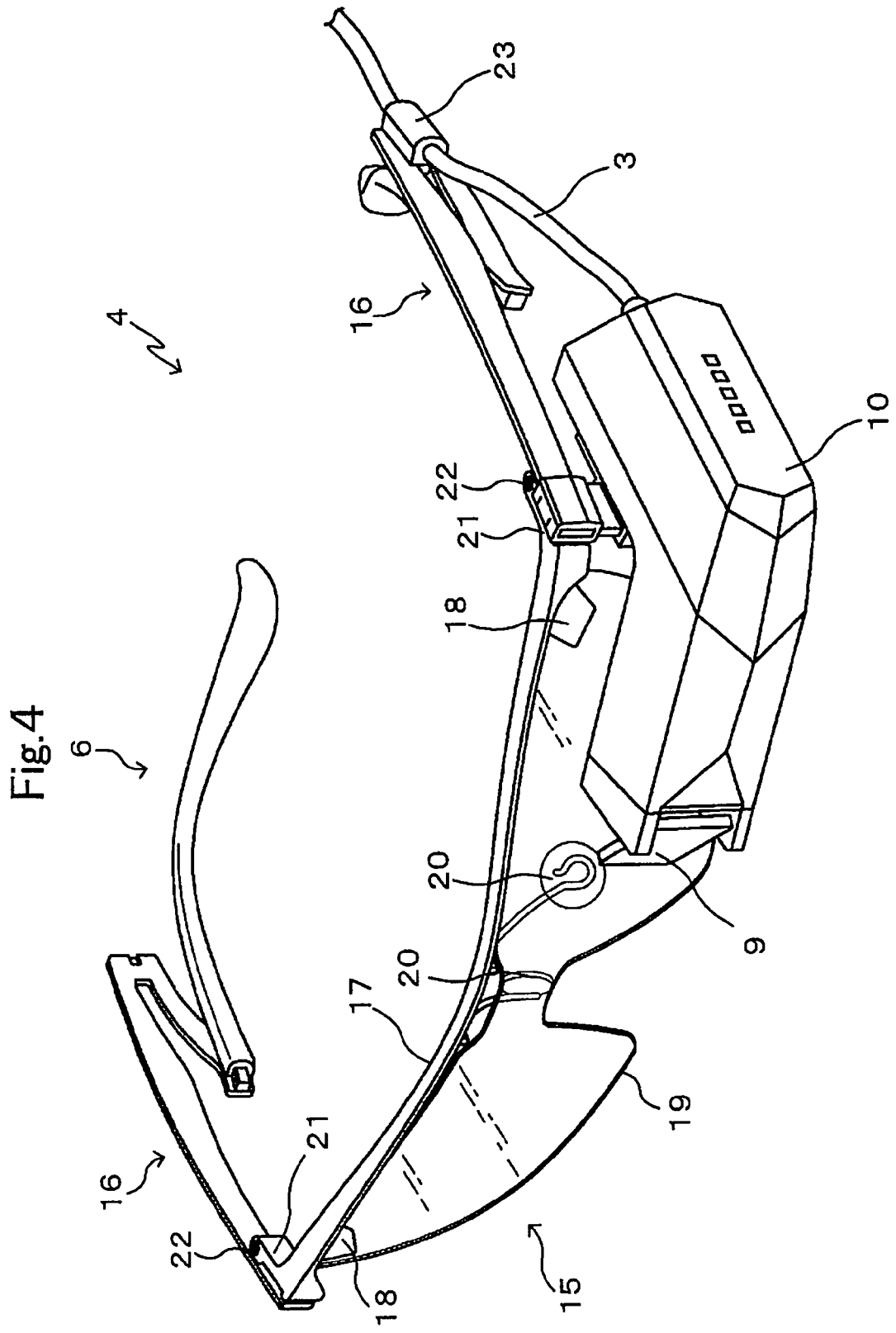
FIG. 4 is a perspective view showing the appearance of the head mounting device.

Next, the overall constitution of the head mounting device 4 of the HMD 1 according to this embodiment is explained in conjunction with FIG. 4.

The eyeglasses-type frame 6 of the head mounting device 4 includes, as shown in FIG. 4, a front portion 15 which is positioned in front of an eye of a user in use, and the temples 16, 16 which extend rearward from both left and right ends of the front portion 15 in use thus providing an approximately eyeglasses shape (see FIG. 3).

The front portion 15 includes a front frame 17 which extends in the left-and-right direction, and a visor portion 19 which is mounted on visor clamping portions 18, 18 which are provided in the vicinity of both end portions of the front frame 17.

The front frame 17 has a large thickness in the front-and-aft direction compared to general-use eyeglasses for correcting visual acuity so that even when the left and right temples 16, 16 are largely opened in the left-and-right direction, the deflection of the front frame 17 is small. The front frame 17 may be preferably formed using metal or resin which exhibits small deflection as a material thereof.

Further, an approximately L-shaped end-piece portion 21 which bends and extends rearward is formed on left and right end portions of the front frame 17. On distal end portions of the respective end-piece portions 21, hinge portions 22 for connecting the temple 16 to the front frame 17 in a foldable manner are mounted respectively. A nose pad portion 20 which supports the front portion 15 on a nose of the user is provided to an approximately center portion of the front frame 17.

In FIG. 4, the projection part 10 is arranged on the right-side temple 16, and a middle portion of the transmission cable 3 which extends from the projection part 10 is fixed to a middle portion of the temple 16 by a cable holding portion 23.

[Specific Constitution of Temple 16]

Figure 5A:
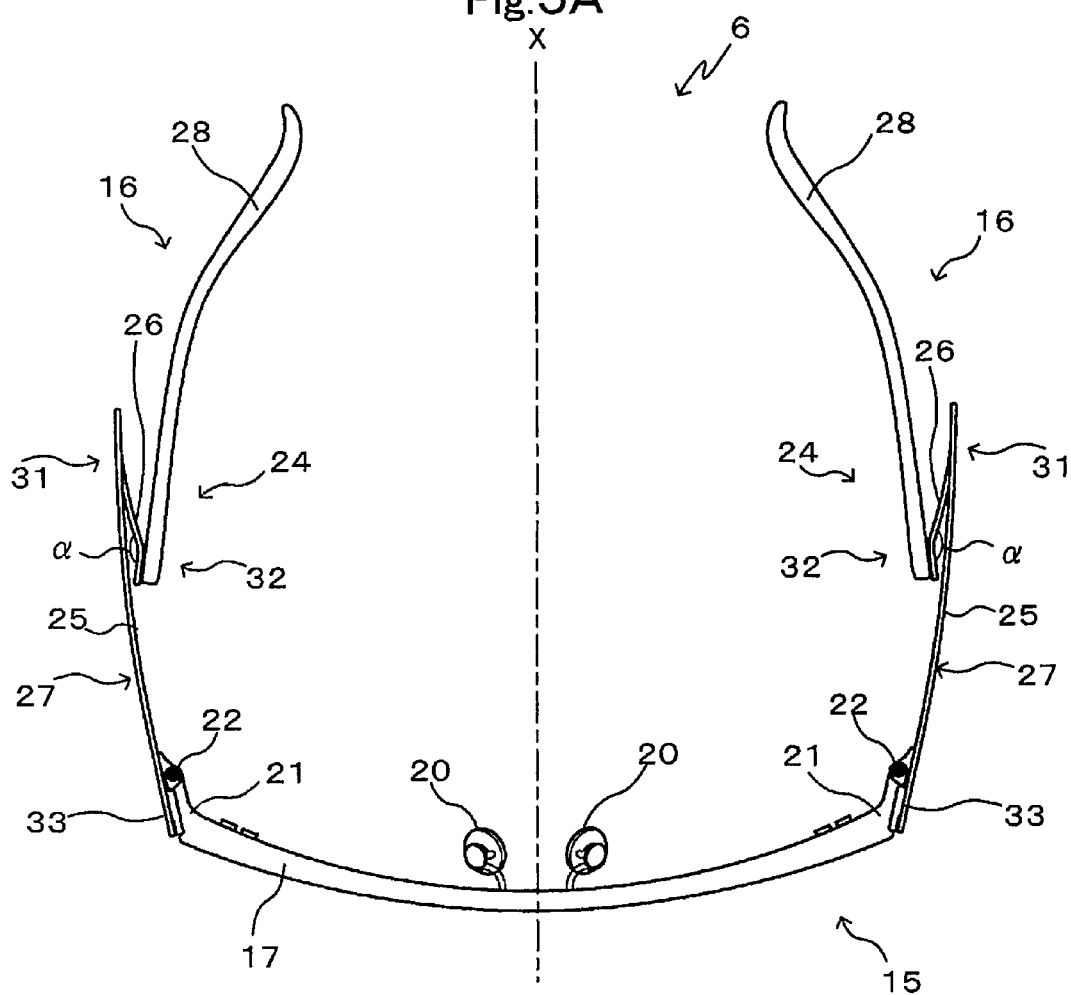
FIG. 5A and FIG. 5B are explanatory views showing the appearance of an eyeglasses-type frame as viewed in a plan view as well as in a side view.
Figure 5B:
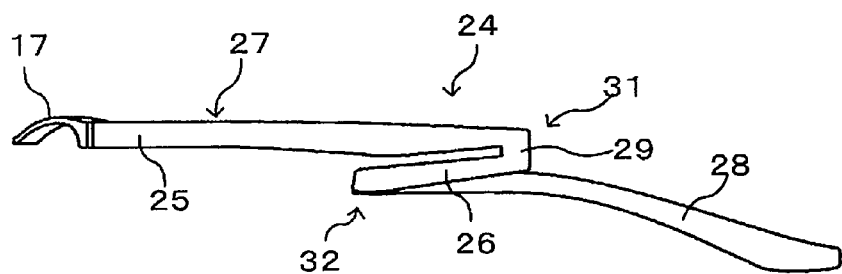

The specific constitution of the temple 16 is explained in conjunction with FIG. 5A and FIG. 5B. In the explanation made hereinafter, "inward" implies the direction toward a center axis X from the respective temples 16, 16 (inward direction) in a state where the temples 16, 16 are opened (a state shown in FIG. 5A), and "outward" implies the direction away from the center line X (outward direction).

As shown in FIG. 5A, the temples 16, 16 are mounted on the front frame 17 in left-and-right symmetry with respect to the center line X. The temples 16, 16 are respectively provided with a resilient bent portion 24 having an approximately Z-shape as viewed in a plan view on middle portions thereof. When the user mounts the eyeglasses-type frame 6 on his head, the resilient bent portions 24 are deflected so that the temples 16, 16 snugly fit in conformity with a shape of the user's head. The temples 16, 16 may preferably be made of metal or resin which exhibits large deflection compared to the front frame 17 as a material.

To be more specific, as shown in FIG. 5A and FIG. 5B, each one of the left and right temples 16 is constituted of a temple front member 27 having an approximately V-shape in a plan view which is formed by bending a middle portion of the temple front member 27 at an acute angle in a hairpin shape, and a temple rear member 28 which is connected to the temple front member 27 and is formed in a curved shape so as to fit a user's head from a temporal region (upper root portion of an ear) to an occipital region of the user.

The temple front member 27 formed in an approximately V-shape in a plan view is constituted of a long member 25 which is positioned on a front frame 17 side, and a short member 26 which is formed by bending back the temple front member 27 frontward from a rear end portion of the long member 25. A portion of the long member 25 in the vicinity of a front end portion of the long member 25 is connected to the front portion 15 in a foldable manner by way of the hinge portion 22. As shown in FIG. 5B, the long member 25 extends rearward while being curved slightly outward and, at the same time, a bent portion 29 which is bent downward at an approximately right angle and is continuously formed with a rear end portion of the short member 26 is formed on a rear end portion of the long member 25.

The short member 26 which is integrally formed with the long member 25 using the same sheet material extends frontward from an end portion of the bent portion 29. To be more specific, the short member 26 is formed such that the short member 26 extends frontward as well as inward from the bent portion 29 as viewed in a plan view. Further, an extending distal end portion of the short member 26 is bent outward at an angle α (see FIG. 5A) thus providing the structure where the short member 26 is easily deflected due to a force directing outward from the inside. The angle α is set to approximately 155 to 165°. The short member 26 also extends frontward from the bent portion 29 at the rear end of the long member 25 and in the slightly oblique downward direction (see FIG. 5B) as viewed in a side view. A distal end portion of the short member 26, that is, a portion of the short member 26 which is bent at the above-mentioned angle α is bonded to a distal end portion of the temple rear member 28 by blazing. The temple rear member 28 is formed into an inwardly extending shape with a rear portion thereof directed slightly downward. The approximately whole temple rear member 28 is covered with a resin to improve a contact between the temple rear member 28 and a skin of a user when the user mounts the eyeglasses-type frame 6 on his head.

By constituting the eyeglasses-type frame 6 in the above-mentioned manner, as also shown in FIG. 5A, a part of a rear side of the long member 25 and the short member 26 forms a first V-shaped bent portion 31 in a plan view at the rear end portion of the temple front member 27, and the short member 26 and the temple rear member 28 form a second V-shaped bent portion 32 having an approximately V-shape in a plan view on a front end portion of the temple rear member 28. Due to the formation of the first V-shaped bent portion 31 and the second V-shaped bent portion 32, a resilient bent portion 24 having an approximately Z-shape in a plan view as well as in a side view is provided.

In other words, the resilient bent portion 24 is formed into a Z-shape in a plan view by sequentially forming the first V-shaped bent portion 31 and the second V-shaped bent portion 32 from a distal end side of the temple 16.

In this manner, by providing the resilient bent portion 24 having a Z-shape in a plan view to a middle portion of the temple 16, the temple 16 can further increase a deflection amount compared to a simple temple used in eyeglasses for correcting visual acuity or the like which has a straight-line shape in a plan view and a J-shape in a side view. Accordingly, the temple 16 can flexibly cope with different face widths and different head shapes.

Further, in the simple temple having a straight-line shape in a plan view, a clamping force which is directed inward is liable to be concentrated on one point, that is, a portion of a user's head having a largest width. To the contrary, according to the temple 16 having the resilient bent portion having a Z-shape, a clamping force is dispersed so that it is possible to prevent a user from having excessive clamping feeling.

For example, in a state before the user mounts the eyeglasses-type frame 6, as shown in FIG. 6A, the short member 26 is in a free state. When the user mounts the eyeglasses-type frame 6 on his head, the resilient bent portion 24 is biased outward corresponding to a face width of the user and, as shown in FIG. 6B, a rear end portion of the temple rear member 28 and a portion of the temple rear member 28 in the vicinity of the rear end portion are moved inward so that the eyeglasses-type frame 6 is snugly fitted on the user's head while gently embracing an occipital region of the user and a portion of the user in the vicinity of the occipital region.

Further, when a user having a large head circumferential size or a wide face width mounts the eyeglasses-type frame 6, the resilient bent portion 24 is biased further outward and, as shown in FIG. 6C, the vicinity of the rear end portion of the temple rear member 28 is moved further inward so that the eyeglasses-type frame 6 is snugly fitted on the user's head while more firmly embracing the vicinity of the occipital region of the user.

Further, a force applied to the user's head is not concentrated on one point and is imparted in a surrounding manner from the substantially whole temple rear member 28 and hence, the user do not feel excessive clamping feeling.

Further, the eyeglasses-type frame 6 according to this embodiment is formed into a Z-shape in a side view and hence, compared to the simple temple which is not provided with the resilient bent portion 24, it is possible to ensure a large width in the vertical direction between the front side and the rear side of the temples 16, 16.

That is, the projection part 10 is arranged in front of an eye of a user in the HMD 1 and hence, to prevent the front frame 17 of the front portion 15 from becoming an obstacle in viewing, it is necessary to arrange the front frame 17 at a position higher than usual eyeglasses whereby it is necessary to set a height position of the front frame 17 considerably higher than an ear of the user. Accordingly, with the general-use simple temple having a straight-line shape, there is no way but to increase the width in the vertical direction between the front side and the rear side of the temple 16, 16 thus giving rise to a drawback with respect to weight. However, according to the eyeglasses-type frame 6 of this embodiment, the temples 16, 16 are formed in a Z-shape in a side view so that it is unnecessary to increase the thickness of the temples 16, 16 in the vertical direction whereby the reduction of weight of the eyeglasses-type frame 6 can be realized.

[Mounting of Projection Part 10 on Eyeglasses-Type Frame 6]

A protruding portion 33 is formed on a front end portion of the long member 25 of each temple 16. The protruding portion 33 extends a hinge portion 22 thereof frontward and hence, as also shown in FIG. 3 and FIG. 4, the projection part 10 can be mounted on the eyeglasses-type frame 6 arranged in front of the resilient bent portion 24.

Figure 7A:
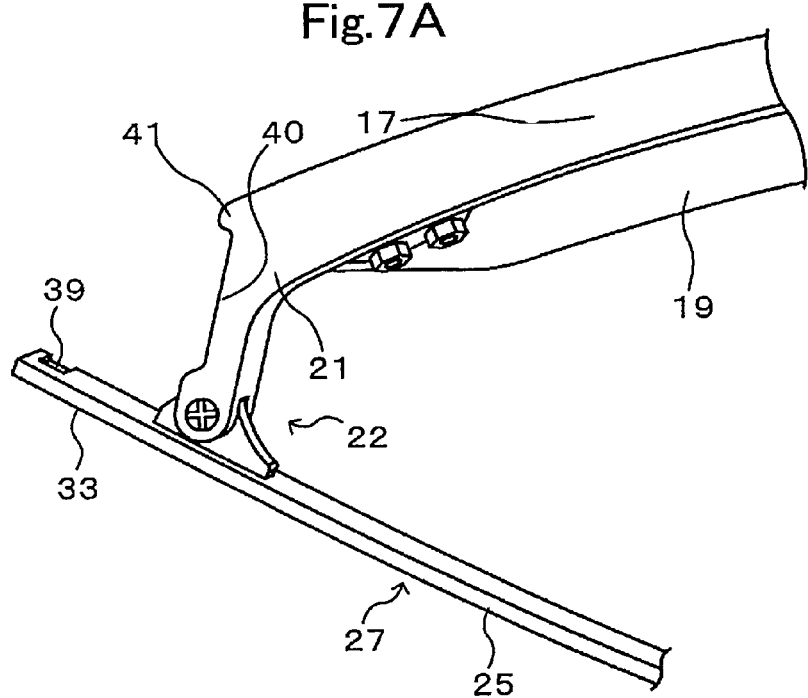
FIG. 7A and FIG. 7B are explanatory views showing the vicinity of an end-piece portion of the eyeglasses-type frame and a mounting member of a projection part.

To explain a mounted state of this projection part 10, as shown in FIG. 7A, a mounting concave portion 39 is formed on a distal end portion of the protruding portion 33.

Figure 7B:
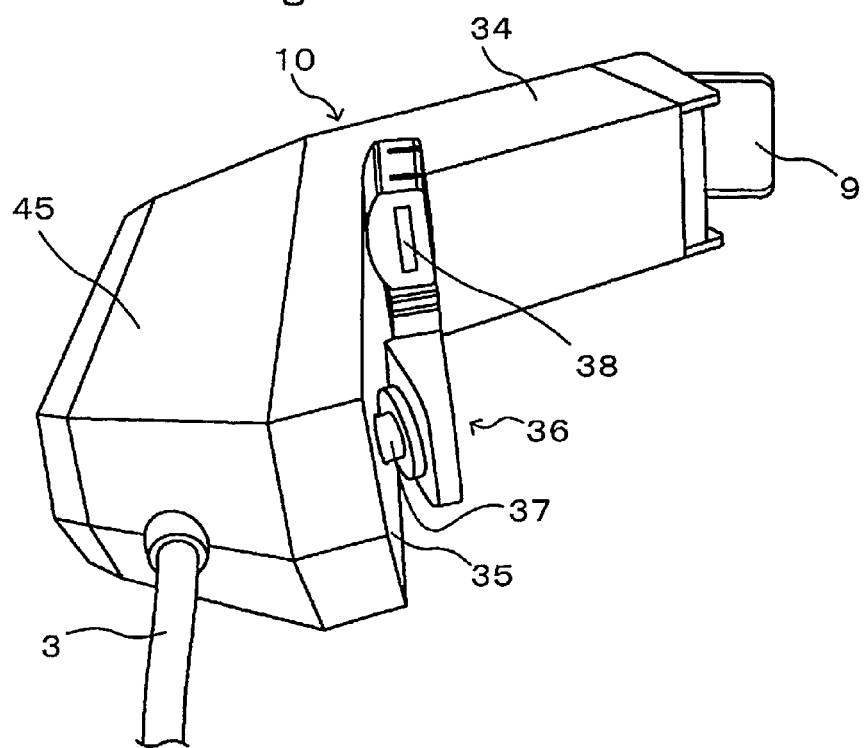

On the other hand, as shown in FIG. 7B, the projection part 10 is constituted of a base end part 45 from which the transmission cable 3 extends, and a distal end part 34 provided with the half mirror 9 which faces an eye of the user thus forming an approximately L shape in a plan view. On an inner surface 35 of the base end part 45, a mounting member 36 which connects the projection part 10 with the eyeglasses-type frame 6 is mounted.

The mounting member 36 rotatably connects the projection part 10 with the eyeglasses-type frame 6 by way of a projection part rotary shaft 37, while a mounting insertion hole 38 having approximately same cross-sectional shape as the protruding portion 33 is formed in an upper portion of the mounting member 36.

Further, a mounting convex portion (not shown in the drawing) which engages with the above-mentioned mounting concave portion 39 by fitting engagement is formed in the inside of the mounting insertion hole 38.

The projection part 10 can be mounted on the eyeglasses-type frame 6 by inserting the protruding portion 33 into the mounting insertion hole 38. Here, the positioning of the projection part 10 after insertion is facilitated by engaging the above-mentioned mounting concave portion 39 and the mounting convex portion by fitting engagement.

Further, a thickness of a side portion of the end-piece portion 21, that is, a thickness of a portion of the end-piece portion 21 which the protruding portion 33 faces when the temple 16 is opened in the left-and-right direction is partially decreased thus forming an end-piece concave portion 40. This end-piece concave portion 40 is a portion provided for reducing a wall thickness around the mounting insertion hole 38 when the protruding portion 33 is inserted into the mounting insertion hole 38 thus mounting the projection part 10 on the eyeglasses-type frame 6, and the temple 16 is opened in the left-and-right direction.

On a distal end of the end-piece concave portion 40, a removal prevention convex portion 41 is formed by bulging the front frame 17 outward. The removal prevention convex portion 41 restricts the frontward movement of the projection part 10 in a state where the temple 16 is opened in the left-and-right direction thus preventing the removal of the projection part 10 from the protruding portion 33.

[First V-Shaped Bent Portion 31]

In the eyeglasses-type frame 6 of the HMD 1 according to this embodiment, as also shown in FIG. 3 and FIG. 4, the cable holding portion 23 can be mounted on the first V-shaped bent portion 31 so that the transmission cable 3 can be held within the eyeglasses-type frame 6.

Figure 8A:
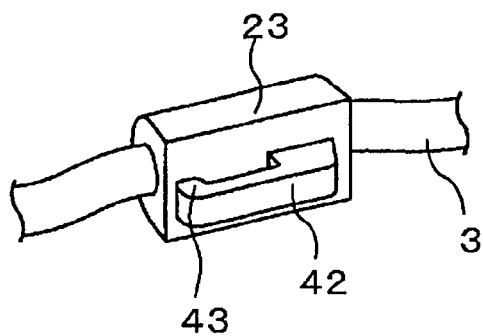
FIG. 8A and FIG. 8B are explanatory views showing a cable holding portion and the resilient bent portion.

To be more specific, as shown in FIG. 8A, a resilient engaging member 42 having an approximately L shape or a pen-clip shape in a plan view is formed on one side surface of the cable holding portion 23 through which the transmission cable 3 passes, and an engaging convex portion 43 is formed on a distal end of the engaging member 42.

Figure 8B:
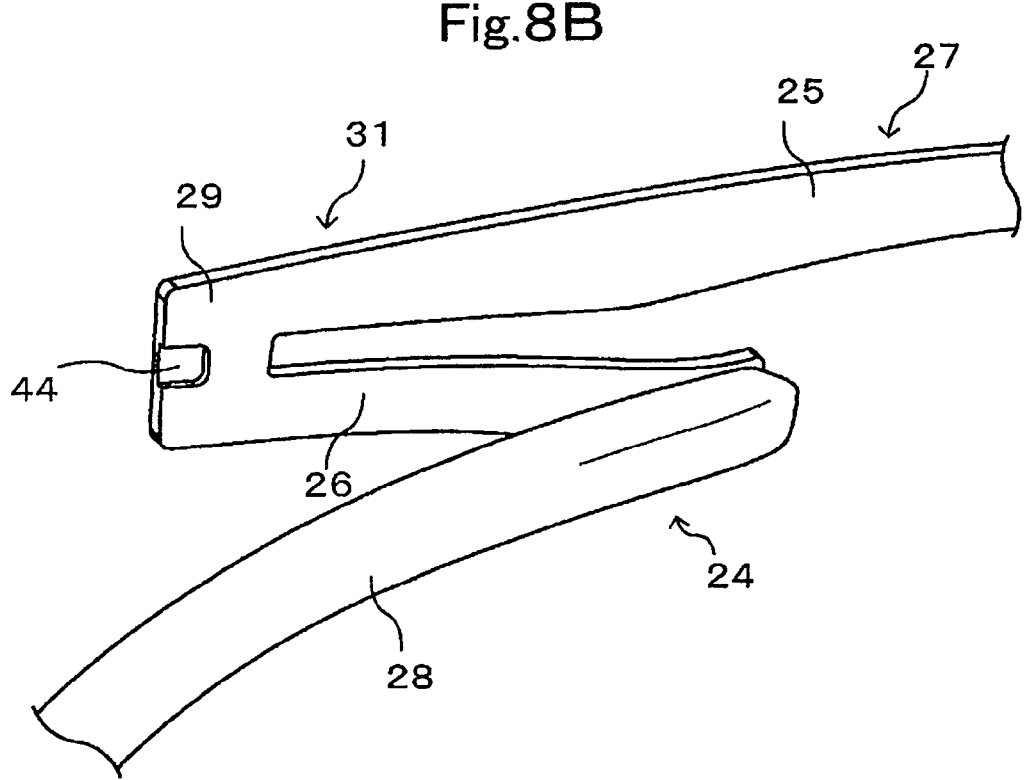

On the other hand, as shown in FIG. 8B, an engaging concave portion 44 which engages with the above-mentioned engaging convex portion 43 is formed on an inner surface of the first V-shaped bent portion 31.

Then, when the engaging member 42 of the cable holding portion 23 is slid rearward along a V-shaped gap of the first V-shaped bent portion 31 which is formed of the long member 25 and the short member 26, the engaging member 42 is brought into contact with the bent portion 29 of the first V-shaped bent portion 31. When the engaging member 42 of the cable holding portion 23 is further slid, the engaging member 42 is separated from the cable holding portion 23 against a resilient force of the engaging member 42 and, thereafter, clamps the bent portion 29 of the first V-shaped bent portion 31 in cooperation with the cable holding portion 23. When the engaging member 42 of the cable holding portion 23 is further slid thus bringing the engaging convex portion 43 into a position above the engaging concave portion 44 which is formed on an inner surface of the bent portion 29, the resilient force generated in the engaging member 42 is released so that the engaging convex portion 43 engages with the engaging concave portion 44 by fitting engagement. In this manner, it is possible to mount the transmission cable 3 on the first V-shaped bent portion 31 using the cable holding portion 23.

Accordingly, it is possible to fixedly mount the transmission cable 3 on the temple 16 without bringing the transmission cable 3 into contact with the ear while positioning the transmission cable 3 as near as possible to an ear of a user.

Figure 9A:
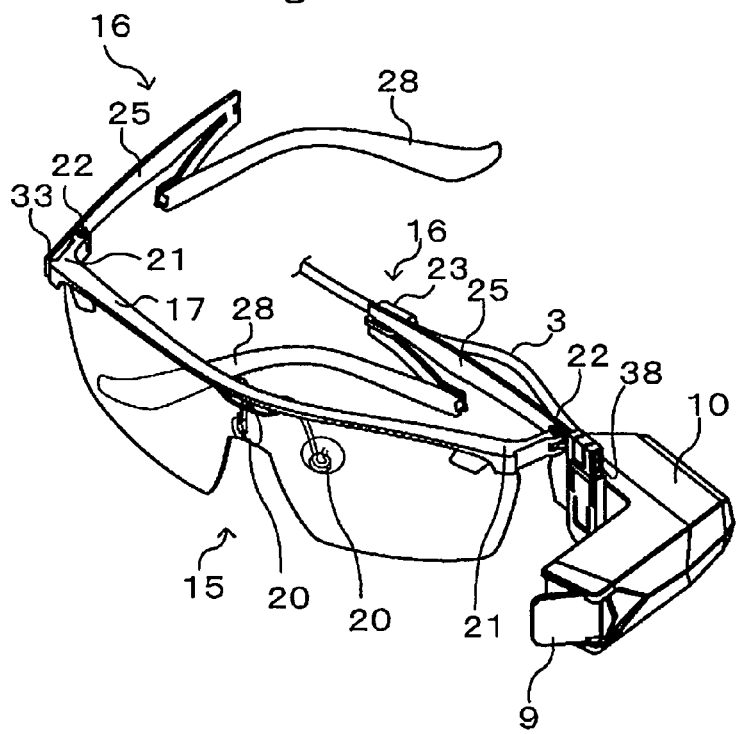
FIG. 9A and FIG. 9B are explanatory views showing the movement of the projection part along with opening/closing of the temple and a state where the projection part is removed from the eyeglasses-type frame.

By adopting the above-mentioned constitution, as shown in FIG. 9A, it is possible to mount the projection part 10 and the cable holding part 23 on the temple 16.

Further, as can be understood from FIG. 9A, the projection part 10 is mounted on the protruding portion 33 formed on the temple 16 and hence, the projection part 10 follows tilting of the temple 16 and can be moved between a position in front of one side (right side in FIG. 3) of the visor part 19 (position taken when the HMD1 is used) and a position on one side of the eyeglasses-type frame 6 (position taken when the HMD is not used).

Accordingly, even when the temples 16 are moved to a closed state from a state where the temples 16 are opened in the left-and-right direction, a distance from the projection part 10 to the cable holding part 23 is not changed. Therefore, there is no possibility that an excessive tension is applied to the transmission cable 3 between the projection part 10 and the cable holding part 23 and hence, it is possible to prevent a load from being applied to a connection portion between the projection part 10 and the transmission cable 3.

That is, by arranging both the projection part 10 and the cable holding part 23 on the temple 16, compared to a case where the projection part 10 is fixed to the front frame 17 and the cable holding part 23 is fixed to the temple 16, it is possible to reduce a load which acts on the transmission cable 3 at the time of opening or closing the temple 16.

Figure 9B:
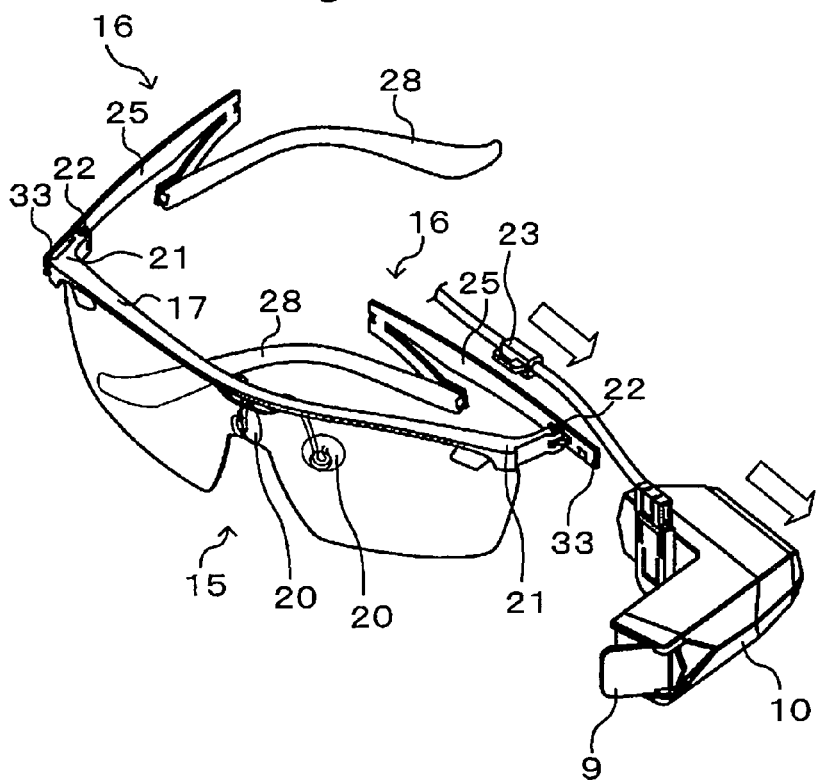

Further, as shown in FIG. 9B, in removing the projection part 10 from the protruding portion 33, by moving the projection part 10 in the direction indicated by a blanked arrow in the drawing, the cable holding part 23 is also removed from the gap of the first V-shaped bent portion 31.

Accordingly, the projection part 10 can be easily removed, and it is possible to prevent an excessive tension from being applied to the transmission cable 3.

Finally, the above-mentioned embodiment merely constitutes an example of the present invention, and the present invention is not limited to the above-mentioned embodiment. Accordingly, it is needless to say that various modifications can be made corresponding to design or the like other than the above-mentioned embodiment without departing from the technical concept of the present invention.

For example, in the drawings used in the explanation of the eyeglasses-type frame 6, the projection part 10 is mounted on the protruding portion 33 on a right side of the drawings. However, the projection part 10 may be mounted on the protruding portion 33 on a left side of the drawings, or may be mounted on the protruding portions 33, 33 on both sides of the drawings.

Further, in the above-mentioned embodiment, the cable holding portion 23 is mounted on the first V-shaped bent portion 31. However, provided that the resiliency of the short member 26 is not deteriorated, the cable holding portion 23 may be mounted on the second V-shaped bent portion 32 by making use of a gradually narrowed shape thereof while adopting the same or similar constitution as the constitution of the first V-shaped bent portion 31.

Further, in the above-mentioned embodiment, the projection part 10 is arranged on the protruding portion 33 formed on the distal end of the temple 16. However, the present invention is not limited to such projection-part arrangement, and the projection part 10 may be arranged on the front frame 17.

In this case, by setting the direction of mounting the projection part 10 on the temple 16 and the direction of removing the projection part 10 from the temple 16 equal to the direction of mounting the cable holding portion 23 on the first V-shaped bent portion 31 and the direction of removing the cable holding portion 23 from the first V-shaped bent portion 31 respectively, it is possible to remove the cable holding portion 23 simultaneously with the removal of the projection part 10.

Further, in the above-mentioned embodiment, the long member 25 and the short member 26 are integrally formed as the temple front member 27. However, the present invention is not limited to such a constitution. For example, the resilient bent portion 24 may be formed of three members consisting of the long member 25, the short member 26 and the temple rear member 28 thus constituting the temple 16.

Further, in the above-mentioned embodiment, the eyeglasses-type frame 6 is exemplified as a part which constitutes the head mounting device 4. However, the eyeglasses-type frame 6 may have an extremely sophisticated design so that the eyeglasses-type frame 6 can be used also as eyeglasses used in a daily life by removing the projection part 10 and the transmission cable 3.

That is, by changing the visor portions 19 of the eyeglasses-type frame 6 with lenses, the eyeglasses-type frame 6 may be used as eyeglasses for correcting visual acuity or may be used as sunglasses.

As described above, according to the HMD 1 of this embodiment, the resilient bent portion 24 having a Z shape in a plan view is mounted on the middle portions of the left and right temples 16, 16 of the eyeglasses-type frame 6, and the projection part 10 is arranged in front of the resilient bent portion 24 of the eyeglasses-type frame 6. Accordingly, it is possible to provide the head mounted display in which the eyeglasses-type frame 6 can be snugly mounted on the user's head even when a large indefinite number of people mount the eyeglasses-type frame 6 on their heads.

Further, the resilient bent portion 24 is formed in a Z shape even in a side view. Accordingly, the temple rear member 28, the resilient bent portion 24 and the temple front member 27 are formed in a stepped manner in this order, and the projection part 10 is mounted above an ear of a user. Accordingly, it is possible to properly project an image onto an eyeball of a user without making a thickness of the temples 16, 16 large in the vertical direction. Further, the head mounted display can exhibit the excellent aesthetic appearance when a user mounts the head mounted display on his head.

Further, the resilient bent portion 24 is formed of the first V-shaped bent portion 31 and the second V-shaped bent portion 32 which are formed sequentially from a distal end side of the temple 16 thus exhibiting a Z shape in a plan view, and the cable holding portion 23 is mountable on the first V-shaped bent portion 31. Accordingly, there is no possibility that a user feels awkwardness by the sagging transmission cable 3, and the transmission cable 3 can be neatly mounted along the temple 16.

Further, in the eyeglasses-type frame 6, the protruding portions 33, 33 which protrude frontward using the support shaft as the proximal end are formed on the left and right temples 16, 16, and the mounting concave portion 39 formed on the projection part 10 can engage with the protruding portions 33, 33 by fitting engagement. Accordingly, the projection part 10 follows tilting of the temple 16 and is moved between a position in front of one side (right side in FIG. 3) of the visor part 19 and a position on one side of the eyeglasses-type frame 6. Accordingly, even when the temples 16 are moved to a closed state from a state where the temples 16 are opened in the left-and-right direction, there is no possibility that an excessive tension is applied to the transmission cable 3 between the projection part 10 and the cable holding part 23 and hence, it is possible to prevent a load from being applied to a connection portion between the projection part 10 and the transmission cable 3.

Further, in the eyeglasses-type frame 6, the projection part 10 is arranged on the front frame 17. Accordingly, even in a state where the left and right temples 16, 16 are opened, it is possible to remove the projection part 10. Further, it is possible to remove the cable holding portion 23 arranged on the first V-shaped bent portion 31 simultaneously with the removal movement of the projection part 10 which is caused by pulling the projection part 10 frontward.

What is claimed is:

1. A head mounted display comprising:
    a projection part which is configured to project an image corresponding to image information onto a retina of an eye of a user; and
    an eyeglass frame which is configured to support the projection part, wherein
    the eyeglass frame comprises left and right temples,
    the left and right temples each comprise a resilient bent portion on middle portions thereof,
    each resilient bent portion is formed of a first V-shaped bent portion and a second V-shaped bent portion which are formed sequentially from a distal end side of the respective temple, and
    the projection part is arranged in front of the resilient bent portion out of the eyeglass frame.

2. The head mounted display according to claim 1, wherein a portion of the resilient bent portion is configured to bend laterally when the eyeglass frame is mounted on a head of the user and to restore to the original shape when the eyeglass frame is removed from the head of the user.

3. The head mounted display according to claim 2, wherein the second V-shaped bent portion is configured to bend laterally when the eyeglass frame is mounted on a head of the user and to restore to the original V-shape when the eyeglass frame is removed from the head of the user.

4. The head mounted display according to claim 1, wherein each of the left and right temples further comprises a temple front member and a temple rear member, each temple front member and each temple rear member are connected via the respective resilient bent portion, and each temple rear member extends laterally in an inward direction from a connection portion between the temple rear member and the respective resilient bent portion.

5. The head mounted display according to claim 4, wherein each temple rear member is configured to embrace a vicinity of an occipital region of the user in response to bending of the respective resilient bent portion when the eyeglass frame is mounted on a head of the user.

6. The head mounted display according to claim 1, wherein the first V-shaped bent portion and the second V-shaped bent portion form a Z shape in a plan view.

7. The head mounted display according to claim 3, further comprising a cable holding part which is configured to hold a cable extending from the projection part on the eyeglass frame, wherein the cable holding portion is mountable on the first V-shaped bent portion.

8. The head mounted display according to claim 1, wherein the eyeglass frame includes a front frame which is connected to the left and right temples by way of support shafts, a protruding portion which protrudes frontward using one of the support shafts as the proximal end is formed on the left and right temples, respectively, and a mounting concave portion formed on the projection part is engageable with the protruding portion by fitting engagement.

9. The head mounted display according to claim 1, wherein the eyeglass frame includes a front frame which is connected to the left and right temples by way of support shafts, and the projection part is arranged on the front frame.

10. The head mounted display according to claim 1, wherein, for each of the first and second temples, the first V-shaped bent portion has a first V-shape, the second V-shaped bent portion has a second V-shape, and the first and second V-shapes extend in a plane containing the left and right temples.

11. The head mounted display according to claim 1, wherein, for each of the first and second temples, the first V-shaped bent portion extends inwardly of the second V-shaped bent portion.

12. The head mounted display according to claim 1, wherein, for each of the first and second temples, the first V-shaped bent portion has a first V-shape, the second V-shaped bent portion has a second V-shape, and the first and second V-shapes extend inwardly of a corresponding one of the left and the right temples.

13. The head mounted display according to claim 1, wherein the eyeglass frame includes a front frame, the left and right temples are each foldable relative to the front frame in a folding direction, and for each of the first and second temples, the first and second V-shaped bent portions are sequentially formed in the folding direction.

14. The head mounted display according to claim 1, wherein the first V-shaped bent portion and the second V-shaped bent portion form a Z shape in a side view.

* * * * *